C. F. FULFORD & C. W. CARROLL.
FINDER FOR PHOTOGRAPHIC CAMERAS.
APPLICATION FILED FEB. 11, 1916.
1,278,132.
Patented Sept. 10, 1918.
2 SHEETS—SHEET 1.
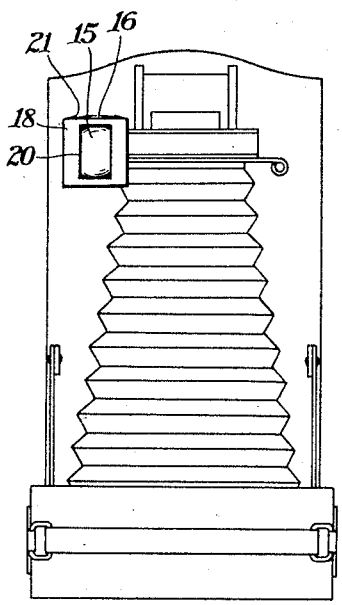
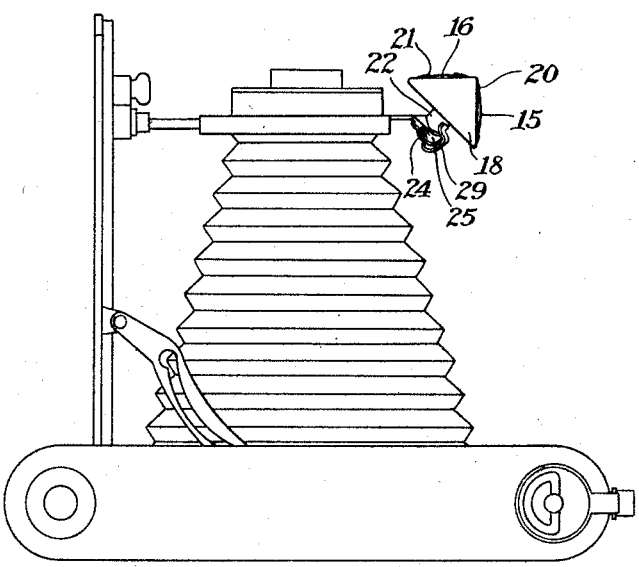
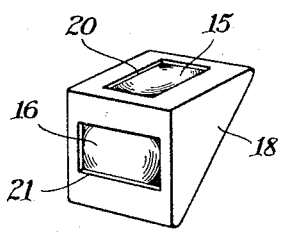
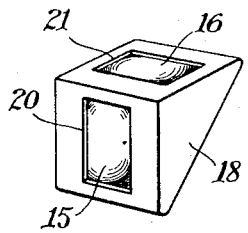
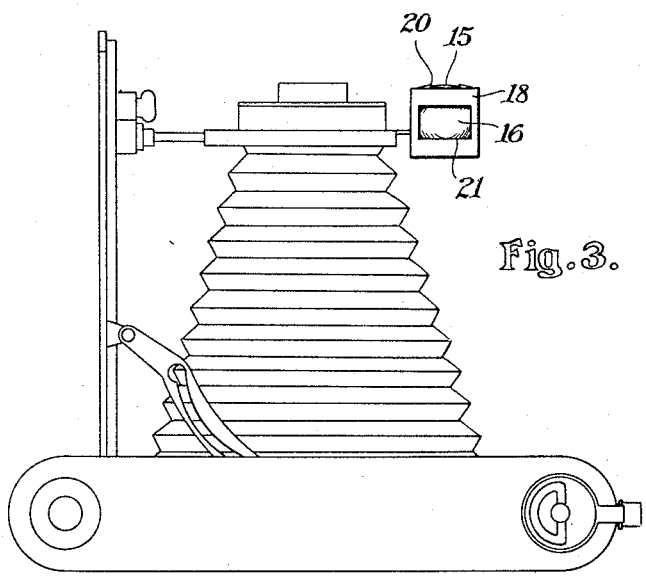
Inventors:
Charles F. Fulford
Clarence W. Carroll C. F. FULFORD & C. W. CARROLL.
FINDER FOR PHOTOGRAPHIC CAMERAS.
APPLICATION FILED FEB. 11, 1916.
1,278,132.
Patented Sept. 10, 1918.
2 SHEETS—SHEET 2.
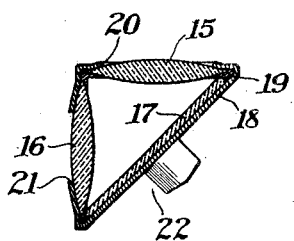
Fig. 6.
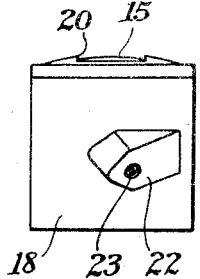
Fig. 7.
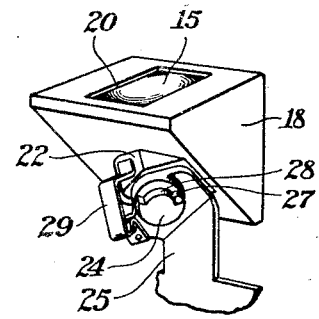
Fig. 8.
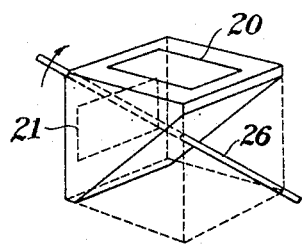
Fig. 9.
Fig. 10.
Fig. 11.
Fig. 13.
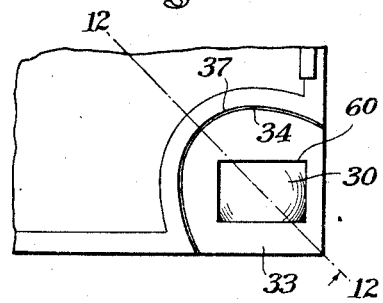
Fig. 12.
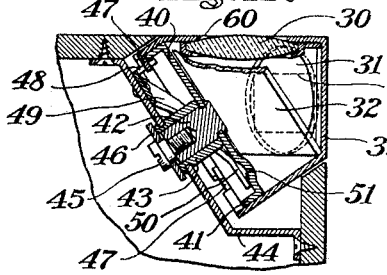
Inventors:
Charles F. Fulford
Clarence W. Carroll

UNITED STATES PATENT OFFICE.

CHARLES F. FULFORD AND CLARENCE W. CARROLL, OF ROCHESTER, NEW YORK.

FINDER FOR PHOTOGRAPHIC CAMERAS.

1,278,132.   Specification of Letters Patent.   Patented Sept. 10, 1918.

Application filed February 11, 1916. Serial No. 77,724.

*To all whom it may concern:*

Be it known that we, CHARLES F. FULFORD and CLARENCE W. CARROLL, being, respectively, a subject of the King of Great Britain and a citizen of the United States, and residents of Rochester, in the county of Monroe and State of New York, have invented certain new and useful Improvements in Finders for Photographic Cameras, of which the following is a specification.

This invention relates to finders for photographic cameras, and one object of the invention is to produce a finder in which the indicated view will have a correct relation to the position of the sensitive film or plate in the camera in either of the two normal operative positions of the latter. Another object is to limit the view shown in the finder to a length and width proportionate to the picture which the camera is adapted to take, so that nothing may be seen in the finder that will not appear in the photograph. A further object is to enable a finder of a given size to cover a larger field of view than has been possible heretofore.

The majority of cameras in use are adapted to take rectangular pictures, the height of which more or less exceeds the width. In one normal operative position of the camera the longer dimension of the plate or film extends from top to bottom, and in the other normal operative position the longer dimension extends from side to side. To enable the user to see the required view in the finder in correct relation to the exposure field of the camera in either normal operative position above mentioned, the optical system of the finder embodying the present invention is provided with two separate view apertures, one of which may be brought uppermost when the camera is in a position to take a picture having a height greater than its width, so as to afford the user a correctly placed view for that position, and the other of which may be brought uppermost when the camera is in the other position, so as to show in the finder a view having a height less than its width.

A novel feature of the finder comprises means whereby the selection of the correct aperture for use with a given position of the camera may be conveniently accomplished. Another novel feature consists of the use, with the two separate view apertures, of a single optical system, which is adapted to receive a view on either of its ends as an objective end, and to project the view upon its other end as a view end, to render the view apparent to the user of the camera. The apertures aforesaid are associated with the optical system of the finder on such a manner that in one position of the camera one serves as an objective aperture and the other serves as a view aperture, and in the second operative position of the camera the end of the optical system that before served as the objective end is moved to such a position that it serves as the view end, and its associated aperture, that was the objective aperture in the first position of the camera, becomes the view aperture in the second position of the camera. The means whereby the finder is moved between its extreme positions operates to place the aperture that is brought to serve as the view aperture into correct relation to the camera in either case. The finder is thus made reversible end for end, and its optical system is also reversible.

The invention is set forth more in detail in the particular construction described in the following specification and shown in the accompanying drawings, in which—

Figure 1 is a top plan view of the camera of the folding type equipped with a finder embodying this invention;

Fig. 2 is a top plan of the same camera laid on its side, before setting the finder to a corresponding position;

Fig. 3 is the same view as Fig. 2, but with the finder turned to exhibit a view to the user;

Fig. 4 is a perspective view of the finder separate from a camera, in one position;

Fig. 5 is a similar view in another position;

Fig. 6 is a central vertical section;

Fig. 7 is a rear elevation;

Fig. 8 is a perspective view from the rear, showing the finder mounted on a support;

Fig. 9 is a diagrammatic perspective view to illustrate the manner of pivoting the finder upon the support;

Fig. 10 is a perspective view showing a modification of the invention, as applied to a camera of the box type;

Fig. 11 is a partial top plan of same;

Fig. 12 is a sectional elevation on the line 12—12 of Fig. 11; and

Fig. 13 is a perspective view of the finder shown in Figs. 10, 11 and 12, separated from the camera.

Referring first to Fig. 6, the optical system of the finder is represented as comprising a pair of lenses 15 and 16, and a reflector 17. The lenses are set, as usual, so that the optical axis of each is normal to the other, and these axes intersect at the reflector 17, so that the latter forms an angle of 45 degrees with each lens. The structure thus far described differs from the standard type of finder in that the lenses 15 and 16 are of equal size and focal length.

The lenses and the reflector are set or inclosed in a suitable casing 18, which may be supplemented by an inner rim 19 or other lens mount. The casing 18 has, concentric with the lens 15, a rectangular, elongated aperture 20, the proportions of which are correct for the camera. The longer dimension of this aperture extends from front to rear when the finder stands as in Figs. 4 and 8. A second aperture 21, exactly the size and shape of the aperture 20 is located concentric with the lens 16, but with its longer dimension extending from side to side of the casing. The dimensions of these apertures may be the maximum which the periphery of the lenses will inclose.

By reason of both lenses having the same dimensions and focal length, the view transmitted through one appears on the other the same size, regardless of which serves as the objective lens and which the view glass. Therefore, if the finder is so mounted that the lenses 15 and 16 can be transposed, together with their respective apertures, the view seen by an observer looking down into the uppermost lens when the camera lies as in Fig. 3 will have its longer dimension extending from side to side, whereas if the camera is placed as in Fig. 1 the longer dimension of the view will extend from front to rear, thus being correlated with the camera in each case. The manner of mounting the finder so that the proper aperture can always be brought uppermost, whether the camera is in the position of Fig. 1 or Fig. 3, and so that the transposition of the lenses can be made to that end, constitutes an important feature of this invention.

On the back of that portion of the casing 18 which is close to the reflector 17 is a wedge-shaped block or projection 22, that has in one face a hole 23 that is adapted to receive a pivot pin 24 which is the axis on which the finder is turned. This rearmost face of the block is normal to the axis of the pivot 24 and forms a bearing surface for a bracket 25, that supports the structure on a camera. This bracket may be a separate piece, or may be, as shown in Fig. 2, a bent-over portion of the front-plate or lens-board, if the lens-board is made of sheet metal, as it is in the better grade of hand cameras.

It will be noted that the finder as shown in Figs. 4 to 8 has approximately the form of one-half of a cube which has been divided diagonally, the rear or reflector side being about on the diagonal line. To clearly understand the relation of the pivot 24 to the finder, let it be assumed that the latter is extended to form a complete cube, as shown by dotted lines in Fig. 9. If this imaginary complete cube had a fixed axis in which it might be rotated, that extended from its front upper left-hand corner to its rear lower right-hand corner, as indicated by the shaft 26, and the cube were turned about said axis through 120 degrees in the direction of the arrow, the face of the cube that is shown as the top in Fig. 9 would become the front, and the front face would become the left-hand side.

Referring now to the finder as shown in Fig. 8, it will be seen that its arrangement on the pivot 24 is identical with that just described, and therefore if the finder is turned about its pivot through 120 degrees the lens 15 is moved to the front to serve as the objective lens, and the lens 16 is transposed so as to be directed toward the left side of the camera. When the camera is turned to the position of Fig. 3, in order to take a picture having a height less than its width, bringing this side uppermost, the lens 16 and the aperture 21 are brought uppermost also, and the view then exhibited on the view glass or upper lens has the same relation of width to height, relatively to the observer, and the same proportions as the picture which the camera is then in position to take.

Suitable means may be provided for limiting the movement of the finder about the pivot 24 to the two positions just described. In Fig. 8 the support 25 is shown as provided with a rearwardly-projecting pin 27, and this pin is adapted to act as a stop against either end of a recess 28 in the enlarged head of the pivot. When the finder is in the position of Fig. 8 the pin 27 acts as a stop at one end of the recess 28, and in the position of Fig. 3 it serves to stop the opposite end. Means may also be provided to retain the finder against accidental displacement when in either position. For this purpose a flat spring 29 is shown as fixed to the support 25, and having a free end that is adapted to bear on one of two adjacent sides of the block 22. While the finder is being turned into either position, the rounded corner of the block that is between these two faces rides across the free end of the spring, and the latter has a tendency to complete the movement. The length of the recess 28 is such that the finder may move through 120 degrees, and the angle between the faces of the block 22 on which the spring bears is proportioned in accordance with this movement. It may be noted that although the finder moves about its pivot through 120 degrees, the difference between its two extreme positions relatively to the camera is only 90 degrees.

The modification shown in Figs. 10, 11 and 12 illustrates the manner of adapting the finder to non-folding or box type cameras. In Fig. 10 the finder is shown as located in the front upper right-hand corner of the camera. Lenses 30 and 31, having associated apertures 60 and 61, respectively, and a reflector 32 are suitably set in proper relation to each other within a shell or casing 33. The form of this shell is peculiar, being a combination of a cylinder and a cube. The axis of the cylindrical portion is coincident with the diagonal axis of the cube that would extend, if the cube were completed as in Fig. 9, from its front upper right-hand corner to its rear lower left-hand corner. The intersection of the surface of the cylinder with the top, front and right sides of the cube results in the formation of three edges 34, 35 and 36, each edge having a contour that is a compound curve. The camera box is cut away at 37, 38 and 39 to coincide with these curved edges, so that when the finder is turned from one to the other of its working positions it will move freely, the necessary clearance being provided. If the edges 37, 38 and 39 are viewed along the imaginary axis of the cube aforementioned they appear as component parts of a complete circle, this circle conforming closely to the diameter of the cylindrical portion of the shell 33.

A convenient arrangement for the pivot of a finder constructed in this form is shown in Fig. 12. The shell 33 is shown as having a flat circular bottom 40, with a downturned flange 41. A plug 42 is fixed in the bottom and is adapted to turn within a sleeve 43. The latter is fixed in a plate 44 so formed that it may be fastened to the inner sides of the camera box, completely inclosing the movable parts of the finder, and excluding light and dust, at the same time being a support for the shell 33. A stud 45 and a washer 46 serve to retain the shell against outward movement. The finder is limited to the required movement of 120 degrees about its axis by means of lugs 47 that are bent inwardly from the bottom edge of the shell 33, and which at the same time retain the bottom 40 in place. Two of the lugs 47 are properly spaced to coöperate with a fixed stop lug 48, which may be struck up from a strip of metal 49 riveted to the plate 44. Said strip may be of spring material and may be extended circularly and outwardly so as to bear against the bottom 40, and a button 50 on its free end may thus be made to snap into one of two depressions 51 in either of the operative positions of the finder, to prevent the latter from accidental displacement. This action occurs when either of the lugs 47 strike the stop 48.

From the foregoing description it is apparent that providing a finder with a single optical system having two separate view apertures obviates the necessity of using a pair of finders on a camera. Heretofore, the usual single finder with which hand cameras are generally provided has consisted of an objective lens, a reflector and a view glass, the latter being larger than the objective lens, so that it would be impossible to substitute one for the other. This view glass is generally provided with an aperture that has an outline resembling a Greek cross, for the reason that the one aperture is supposed to be adapted to exhibit both a view having a height greater than its width, and one having a height less than its width without shifting the aperture plate. Consequently the user in taking either type of picture may see in such a view aperture a view of the type which it is not desired to obtain, and many users of cameras equipped with such finders spoil many pictures because they do not allow for this discrepancy. Furthermore, it is possible with the finders of this style, to hold the camera for a "horizontal" picture (as in Fig. 3) and at the same time see in the view glass an "upright" view, or one in which the height exceeds the width. The reverse is also true. In other words, the view aperture is not positively correlated to the camera in both positions, and is not limited to the field that it is supposed to cover.

In the present invention it is impossible to set either aperture so that a view seen by an observer looking down into it (with the camera held in a normal operative position) is anything other than the view corresponding to that which will appear in the picture. That is, if the camera stands as shown in Fig. 2, the aperture 20, which is for an "upright" picture, cannot be brought uppermost, but only the aperture 21 may be set so that an observer may look down into it, and the aperture 21 is the one that exhibits a "horizontal" view. This valuable result is accomplished by the novel arrangement of the mounting bracket and its pivot, and the stop which permits the finder to move only between positions that are 90 degrees apart, although the actual traverse of the finder about its pivot is through 120 degrees. The reversibility of the optical system, whereby a view is seen equally well and the same size through either end, is the factor of the invention which renders possible the use of only two apertures in the finder, so that one aperture may serve as an objective aperture when it is not in use as a view aperture, and may be transposed to take the place of the other when required, to exhibit a differently placed field of view. The interchangability of the lenses reduces the parts of the structure to a minimum, and avoids the use of any separate moving pieces in the finder.

It has been found by experiment that a finder made in accordance with this invention will give a greater field of view in a casing of a given size than a finder in which the objective lens and the view glass are not alike, or, conversely, a given field of view may be obtained by the use of a smaller finder. This is a consideration of value because the makers of cameras are constantly striving to make them smaller and lighter. It has been found also that it is impossible, in a finder that exhibits a field equivalent to that covered by the exposure lens of the majority of cameras, to see the objective aperture when looking into the view aperture.

The foregoing description sets forth particular constructions, the details of which may be varied to suit the requirements of manufacture and of use, without departing from the scope of the invention as it is defined in the following claims.

We claim:—

1. A finder for photographic cameras having an optical system provided with two separated apertures, each conforming to a required field of view, and means for supporting said finder so that it may be turned about an axis at an angle with the plane of each of said apertures.

2. A finder for photographic cameras having an optical system comprising duplicate lenses and a reflector, each of said lenses being provided with an aperture conforming to a required field of view, and means for supporting said finder so that it may be turned about an axis at an angle with the axis of each lens and with the reflector.

3. A finder for photographic cameras having an optical system comprising duplicate lenses and a reflector, each of said lenses being provided with an aperture conforming to a required field of view, and means for supporting said finder so that it may be turned about an axis that is at an angle to the plane of each lens, said axis being directed toward a point equidistant from the centers of said lenses.

4. A finder for photographic cameras having an optical system comprising duplicate lenses and a reflector, each of said lenses being provided with an aperture conforming to a required field of view, and means for supporting said finder so that it may be turned about an axis that diagonally intersects the optical axes of said lenses at their common intersection.

5. A finder for photographic cameras having an optical system comprising duplicate lenses and a reflector, each of said lenses being provided with an aperture conforming to a required field of view, and means for supporting said finder so that it may be turned about an axis that diagonally intersects the axis of each lens in the plane of the reflector.

6. A finder for photographic cameras having, in combination, an optical system in which the objective lens and the view glass are interchangeable in function, said objective lens and said view glass each being provided with an aperture conforming to a required field of view, and a mounting comprising a pivot so arranged that when the finder is moved to correlate either of said apertures with a camera to serve as a view aperture the movement of said finder relatively to its pivot is through 120 degrees, and its movement relatively to the optical axis of the camera is through 90 degrees.

7. A finder for photographic cameras in the form of a half cube diagonally divided, and having, in combination, a reflector in the plane of the diagonal division of the cube, lenses of the same focal length arranged with their axes normal to each other and at equal angles to said reflector, each of said lenses being provided with an aperture conforming to a required field of view, and means for mounting said finder upon an axis which if extended, and if the cube were completed, would extend from one corner of the cube to a diagonally opposite corner.

8. A finder for photographic cameras in the form of a half cube diagonally divided, and having, in combination, a reflector in the plane of the diagonal division of the cube, lenses of equal focal length arranged with their axes normal to each other and intersecting in the plane of said reflector, each of said lenses being provided with an aperture conforming to a required field of view, and a support for said finder adapted for attachment to a camera and providing an axis of rotation for said finder that is coincident with a diagonal of the cube.

9. A finder for photographic cameras in the form of a half cube diagonally divided, and having, in combination, a reflector in the plane of the diagonal division of the cube; lenses of equal focal length arranged with their axes normal to each other and at equal angles to said reflector, each of said lenses being provided with an aperture conforming to a required field of view, a projection from the back of the finder having an axis for the rotation of said finder that is coincident with a diagonal of the cube; a supporting bracket for said finder; and means for limiting the movement of the finder to the required positions of use.

10. A finder for photographic cameras in the form of a half cube diagonally divided, and having, in combination, a reflector in the plane of the diagonal division of the cube; lenses of the same focal length arranged with their axes normal to each other and at equal angles to said reflector; each of said lenses being provided with an aperture conforming to a required field of view, a projection from the back of the finder having an axis for the rotation of said finder that is coincident with a diagonal of the cube, and having an angular face normal to the axis of rotation; and a supporting bracket with a bearing surface for the angular face of said projection.

CHARLES F. FULFORD.
CLARENCE W. CARROLL.

Copies of this patent may be obtained for five cents each, by addressing the "Commissioner of Patents, Washington, D. C."